United States Patent
Squillace et al.

(10) Patent No.: US 11,937,356 B2
(45) Date of Patent: Mar. 19, 2024

(54) DIAGNOSING A PROBLEM OCCURRING WHEN CONTROLLING A LIGHTING DEVICE BASED ON LIGHTING DEVICE GROUPING INFORMATION

(71) Applicant: SIGNIFY HOLDING B.V., Eindhoven (NL)

(72) Inventors: Jorge Gabriel Squillace, Eindhoven (NL); Serdar Buyuksarac, Eindhoven (NL); Remco Magielse, Tilburg (NL); Ludolf Jan Woltjer, Breukelen (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 368 days.

(21) Appl. No.: 17/440,206

(22) PCT Filed: Mar. 6, 2020

(86) PCT No.: PCT/EP2020/055983
§ 371 (c)(1),
(2) Date: Sep. 17, 2021

(87) PCT Pub. No.: WO2020/187603
PCT Pub. Date: Sep. 24, 2020

(65) Prior Publication Data
US 2022/0167489 A1    May 26, 2022

(30) Foreign Application Priority Data
Mar. 18, 2019 (EP) ..................... 19163507

(51) Int. Cl.
*H05B 47/20* (2020.01)
*G06F 3/16* (2006.01)
*H05B 47/19* (2020.01)

(52) U.S. Cl.
CPC ............. *H05B 47/20* (2020.01); *G06F 3/167* (2013.01); *H05B 47/19* (2020.01)

(58) Field of Classification Search
CPC .......... H05B 47/20; H05B 47/19; G06F 3/167
See application file for complete search history.

(56) References Cited

U.S. PATENT DOCUMENTS

| 5,442,257 A | 8/1995 | Mitsumoto |
| 2014/0340190 A1 | 11/2014 | Setomoto et al. |

(Continued)

FOREIGN PATENT DOCUMENTS

| JP | 2008123745 A | 5/2008 |
| JP | 2008166151 A | 7/2008 |

(Continued)

*Primary Examiner* — Daniel D Chang (57) ABSTRACT

A method comprises receiving (222,224,226,232,234,236) information identifying power on/off-related behavior (e.g. shutdown moment and/or elapsed time) from each of the plurality of lighting devices and partitioning the plurality of lighting devices in groups of lighting devices, e.g. Group1: L1+L2 and Group2: L3, based on the received information. Each of the groups comprises only lighting devices with similar power on/off-related behavior. The method further comprises controlling (242) the lighting device in response to a user command, determining that a problem has occurred when controlling the lighting device, and identifying the group that comprises the lighting device. The method also comprises determining a power on/off state of at least one other lighting device in the identified group, determining diagnostic information based the determined power on/off states, and providing (243) the diagnostic information to the user. The diagnostic information indicates a likely cause for the problem.

15 Claims, 7 Drawing Sheets

(56) References Cited

U.S. PATENT DOCUMENTS

2018/0177035 A1\* 6/2018 Vangeel ................ H05B 47/20
2018/0235039 A1   8/2018 Krajnc et al.
2020/0170094 A1\* 5/2020 Magielse ............... H05B 47/19

FOREIGN PATENT DOCUMENTS

| JP | 2015018636 A | 1/2015 |
| JP | 2016178043 A | 10/2016 |
| WO | 2017042283 A1 | 3/2017 |
| WO | 2018206378 A1 | 11/2018 |
| WO | 2020048861 A1 | 3/2020 |
| WO | 2021001184 A1 | 1/2021 |

\* cited by examiner

| Lmp | Shutdown | Grp | Grp Cnt |
|-----|----------|-----|---------|
| L1  | $t_2$    | 1   | 1       |
| L2  | $t_1$    | 1   | 1       |
| L3  | $t_3$    | 2   | 1       |
| L4  | $t_4$    | 2   | 1       |

53

| Lmp | Shutdown | Grp | Grp Cnt |
|-----|----------|-----|---------|
| L1  | $t_6$    | 1   | 2       |
| L2  | $t_5$    | 1   | 2       |
| L3  | $t_3$    | 2   | 1       |
| L4  | $t_4$    | 2   | 1       |

55

| Lmp | Shutdown | Grp | Grp Cnt |
|-----|----------|-----|---------|
| L1  | $t_a$    | 1   | N       |
| L2  | $t_b$    | 1   | N       |
| L3  | $t_c$    | 2   | M       |
| L4  | $t_d$    | 2   | M       |

DIAGNOSING A PROBLEM OCCURRING WHEN CONTROLLING A LIGHTING DEVICE BASED ON LIGHTING DEVICE GROUPING INFORMATION

CROSS-REFERENCE TO PRIOR APPLICATIONS

This application is the U.S. National Phase application under 35 U.S.C. § 371 of International Application No. PCT/EP2020/055983, filed on Mar. 6, 2020, which claims the benefit of European Patent Application No. 19163507.7, filed on Mar. 18, 2019. These applications are hereby incorporated by reference herein.

FIELD OF THE INVENTION

The invention relates to a control system for controlling a plurality of lighting devices and partitioning said plurality of lighting devices into groups.

The invention further relates to a method of controlling a plurality of lighting devices and partitioning said plurality of lighting devices into groups.

The invention also relates to a computer program product enabling a computer system to perform such a method.

BACKGROUND OF THE INVENTION

Connected lighting systems such as the Philips Hue system allow a user to control lighting devices remotely, e.g. using a mobile device or a wireless light switch. Typically, one button of the mobile device or wireless light switch can be associated with a plurality of lighting devices. In the Philips Hue system, the user can search for new lighting devices, see the types of the new lighting devices, manually control the new lighting devices, associate the new lighting devices with spatial areas, e.g. rooms, and associate lighting control devices and scenes with spatial areas.

US 2014/0340190 A1 discloses a wireless control system which assigns the same identification information to lamps wired to the same wall switch to allow a user to turn on and off the lamps wired to the same wall switch with a single button press on a remote control. The wireless control system determines which lamps are wired to the same wall switch based on the elapsed time periods since being powered on as measured by the lamps.

A drawback of the wireless control system of US 2014/0340190 A1 is that if no lamp turns on when the "on" button of the remote control is pressed, the user has no idea why no lamp turns on.

SUMMARY OF THE INVENTION

It is a first object of the invention to provide a control system for controlling a plurality of lighting devices, which is able to provide diagnostic information when a control problem occurs.

It is a second object of the invention to provide a method of controlling a plurality of devices, which provides diagnostic information when a control problem occurs.

In a first aspect of the invention, a control system for controlling a plurality of lighting devices and partitioning said plurality of lighting devices into groups comprises at least one input interface, at least one output interface, and at least one processor configured to use said at least one input interface to receive information identifying power on/off-related behavior from each of said plurality of lighting devices and partition said plurality of lighting devices in groups of lighting devices based on said received information, each of said groups comprising only lighting devices with similar power on/off-related behavior.

Said at least one processor is further configured to use said at least one output interface to control a lighting device of said plurality of lighting devices in response to a user command, determine that a problem has occurred when controlling said lighting device, identify one group of said groups, said one group comprising said lighting device, determine a power on/off state of at least one other lighting device in said identified group, determine diagnostic information based said determined power on/off states, said diagnostic information indicating a likely cause for said problem, and use said at least one output interface to provide said diagnostic information to said user.

By partitioning lighting devices in groups based on power on/off-related behavior of the lighting devices, it is possible to determine whether a problem that has occurred when controlling a lighting device is caused by a power outage affecting all lighting devices, is caused by a wall switch or power strip being switched off or is caused by something else. By providing this information as diagnostic information to the user, the user may be able to solve the problem faster. Said control system may be a (light) bridge, for example.

Said at least one processor may be configured to provide said diagnostic information using speech output. This allows a device without a display, e.g. a (light) bridge or wireless light switch, to provide the diagnostic information to the user.

Said at least one processor may be configured to determine a power on/off state of at least one other lighting device in said identified group by determining a power on/off state of all lighting devices in said identified group. Although determining that one other lighting device in the group of the unreachable lighting device is unreachable is often enough to determine that the problem is likely due to a power outage or wall switch or power strip being switched off, the reliability of this determination is further improved by determining the reachability of all the lighting devices in the group of the unreachable lighting device. In this case, if multiple lighting devices are unreachable, they are assumed to be powered off.

Said at least one processor may be configured to determine a further power on/off state of one or more further lighting devices of said plurality of lighting devices, said one of more further lighting devices being part of a further group of said groups, and determine said diagnostic information further based on said one or more further power on/off states. This makes it possible to determine whether the problem is likely due to a power outage or alternatively, is likely due to a wall switch or power strip being switched off.

Said one or more further lighting devices may comprise at least one lighting device from each of said groups. Although determining that one lighting device in another group is unreachable is often enough to determine that the problem is likely due to a power outage, the reliability of this determination is further improved by determining the reachability of at least one lighting device from each group. This may also be used to determine whether the power outage affects the entire house or only lighting devices connected to one electrical group/fuse or ground-fault circuit interrupter.

Said at least one processor may be configured to use said at least one output interface to transmit one or more requests for at least part of said information identifying said power on/off-related behavior to one or more of said plurality of lighting devices. Although certain lighting devices may be able to transmit information indicating that they are shutting down upon shutting down (i.e. last-breath messages), not all lighting devices may be able to do this, or the control system may not be reachable while these lighting devices transmit this information. It is therefore beneficial to let the control system poll the lighting devices regularly.

Said at least one processor may be configured to use said at least one output interface to transmit said one or more requests to said one or more of said plurality of lighting devices upon startup of said control system. If the control system is powered off, some or all of the lighting devices may be powered off as well. By polling the lighting devices upon startup, it may be possible to improve the partitioning of the lighting devices right away.

Said information identifying said power on/off-related behavior received from one of said plurality of lighting devices may comprise a time stamp indicating when said lighting device last turned off and/or a duration indicating how long said lighting device has been turned on. The former has as advantage that no timer needs to be used to measure elapsed time. The latter has advantage that no non-volatile memory needs to be used to store the time stamp while the lighting device is powered off. If both are used, it may be possible to determine exactly when the lighting devices were powered off and this may be included in the diagnostic information provided to the user.

Said at least one processor may be configured to partition said plurality of lighting devices in said groups of lighting devices by determining a potential new group for lighting devices showing similar power on/off-related behavior, increasing a counter associated with said new group each time said lighting devices show similar power on/off-related behavior, and assigning said lighting devices to said new group when said counter reaches a minimum value. In this way, the partitioning improves as more information becomes available.

In a second aspect of the invention, a method of controlling a plurality of lighting devices and partitioning said plurality of lighting devices into groups comprises receiving information identifying power on/off-related behavior from each of said plurality of lighting devices and partitioning said plurality of lighting devices in groups of lighting devices based on said received information, each of said groups comprising only lighting devices with similar power on/off-related behavior.

Said method further comprises controlling a lighting device of said plurality of lighting devices in response to a user command, determining that a problem has occurred when controlling said lighting device, identifying one group of said groups, said one group comprising said lighting device, determining a power on/off state of multiple lighting devices in said identified group, determining diagnostic information based said determined power on/off states, said diagnostic information indicating a likely cause for said problem, and providing said diagnostic information to said user. Said method may be performed by software running on a programmable device. This software may be provided as a computer program product.

Said diagnostic information may be provided using speech output, for example. Said method further comprise determining a further power on/off state of one or more further lighting devices of said plurality of lighting devices, wherein said diagnostic information is further determined based on said one or more further power on/off states.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for controlling a plurality of lighting devices and partitioning said plurality of lighting devices into groups.

The executable operations comprise receiving information identifying power on/off-related behavior from each of said plurality of lighting devices and partitioning said plurality of lighting devices in groups of lighting devices based on said received information, each of said groups comprising only lighting devices with similar power on/off-related behavior.

The executable operations further comprise controlling a lighting device of said plurality of lighting devices in response to a user command, determining that a problem has occurred when controlling said lighting device, identifying one group of said groups, said one group comprising said lighting device, determining a power on/off state of multiple lighting devices in said identified group, determining diagnostic information based said determined power on/off states, said diagnostic information indicating a likely cause for said problem, and providing said diagnostic information to said user.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
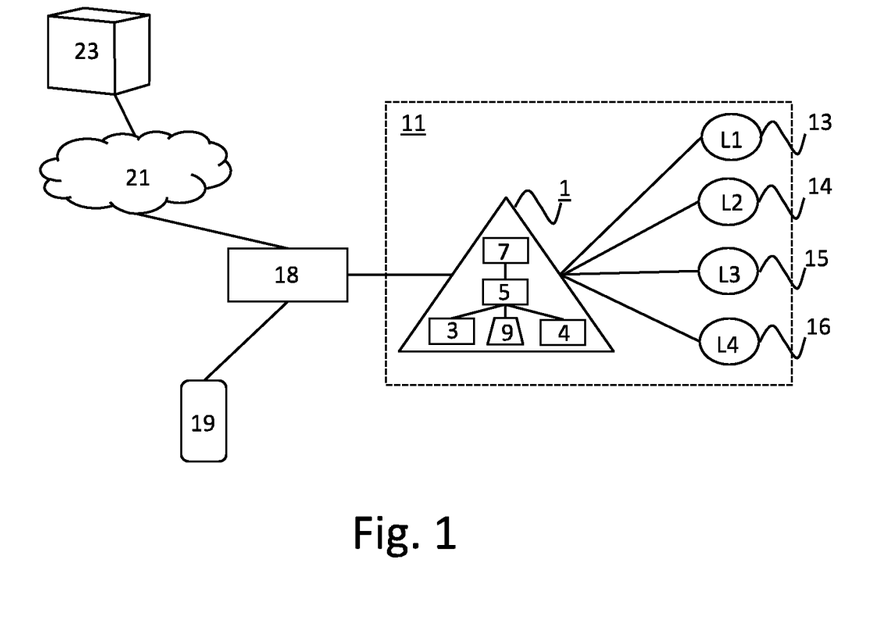
FIG. 1 is a block diagram of an embodiment of the control system.

FIG. 1 shows an embodiment of the control system for controlling a plurality of lighting devices: a bridge 1. The plurality of lighting devices comprises lighting devices 13-16. A lighting system 11 comprises the bridge 1 and lighting devices 13 to 16.

The bridge 1 is connected to the wireless LAN access point 18, e.g. via Ethernet. The wireless LAN access point 18 is connected to the Internet (backbone) 21, e.g. via cable, ADSL or fiber-to-the-curb. The bridge 1 communicates with the lighting devices 13-16, e.g. using Zigbee technology. The bridge 1 may be a Philips Hue bridge, for example. The lighting devices 13-16 may be Philips Hue lights, for example.

The lighting devices 13-16 can be controlled, via the bridge 1, by Internet server 23 or by mobile device 19. The mobile device 19 may run the Hue app, for example. The Internet server 23 is connected to the Internet (backbone) 21 and may be a Hue server, for example.

The bridge 1 comprises a receiver 3, a transmitter 4, a processor 5, a memory 7, and a speaker 9. The processor 5 is configured to use receiver 3 to receive information identifying power on/off-related behavior from each of the lighting devices 13-16 and partition the lighting devices 13-16 in groups of lighting devices based on the received information. Each of the groups comprises only lighting devices with similar power on/off-related behavior.

The processor 5 is further configured to use the transmitter 4 to control one or more of the lighting devices 13-16 in response to a user command, determine that a problem has occurred when controlling a lighting device, identify the group that comprises the lighting device, determine a power on/off state of at least one other lighting device in the identified group, determine diagnostic information based the determined power on/off states, and provide the diagnostic information to the user.

The diagnostic information indicates a likely cause for the problem. In the embodiment of FIG. 1, the processor 5 is configured to use the speaker 9 to provide the diagnostic information using speech output. In an alternative embodiment, the diagnostic information is (also) transmitted to a device from which the user command was received, e.g. a wireless light switch. mobile device or Internet server, and rendered at this device. For example, an app on the mobile device may provide speech output and/or an in-app message, e.g. indicating that there was an outage or that the user is trying to control a light device that is behind a wall switch or power strip that is switched off.

In the embodiment of FIG. 1, the lighting devices 13-16 report that they are tuning off via Zigbee, store a real time clock time stamp when they turn off and/or store a counter of for how long they have been on. The bridge 1 will then determine if only a wall switch or power strip went down or the whole power went down. If the lighting devices 13-16 report that they are turning off, the bridge 1 is able to detect ongoing power outages and report these via the cloud, e.g. to determine quality of service statistics.

However, this may not work if power to the bridge 1 is also cut. In this case, the bridge 1 may only be able to report the outage upon startup, i.e. after it has booted. Furthermore, the bridge 1 may not have been able to receive all transmissions from the lighting devices 13-16 in this case and may need to obtain the stored time stamps or counters from the lighting devices 13-16. This may not only be useful when the lighting devices 13-16 report that they are turning off, but also when the lighting devices 13-16 report that they are turning on, because the bridge 1 may take longer to boot than the lighting devices 13-16.

In the embodiment of the bridge 1 shown in FIG. 1, the bridge 1 comprises one processor 5. In an alternative embodiment, the bridge 1 comprises multiple processors. The processor 5 of the bridge 1 may be a general-purpose processor, e.g. ARM-based, or an application-specific processor. The processor 5 of the bridge 1 may run a Unix-based operating system for example. The memory 7 may comprise one or more memory units. The memory 7 may comprise one or more hard disks and/or solid-state memory, for example. The memory 7 may be used to store a table of connected devices, for example.

The receiver 3 and the transmitter 4 may use one or more wired or wireless communication technologies such as Ethernet to communicate with the wireless LAN access point 18, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The bridge 1 may comprise other components typical for a network device such as a power connector. The invention may be implemented using a computer program running on one or more processors.

In the embodiment of FIG. 1, the control system is a bridge. In an alternative embodiment, the system may be a different type of control system, e.g. a lighting device with a controlling role. In the embodiment of FIG. 1, the control system consists of only one device. In an alternative embodiment, the control system comprises multiple devices.

Figure 2:
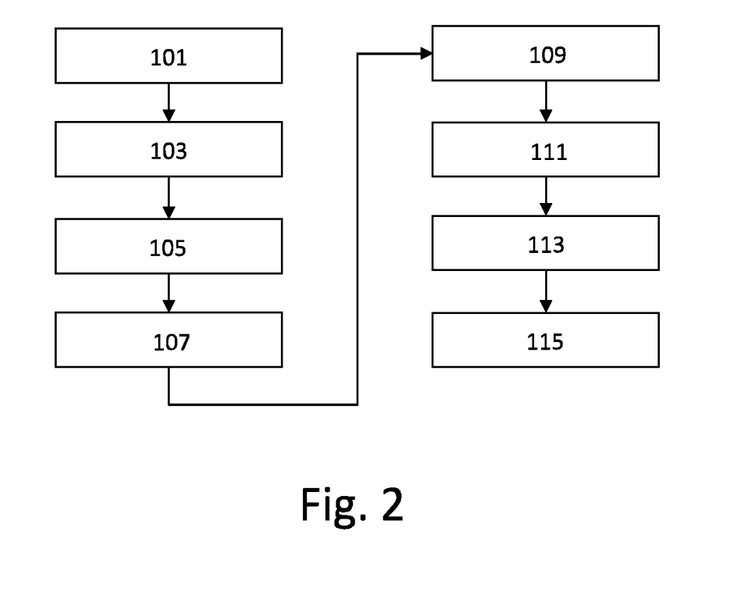
FIG. 2 is a flow diagram of a first embodiment of the method.

A first embodiment of the method of controlling a plurality of lighting devices and partitioning the plurality of lighting devices into groups is shown in FIG. 2. A step 101 comprises receiving information identifying power on/off-related behavior from each of the plurality of lighting devices. A step 103 comprises partitioning the plurality of lighting devices in groups of lighting devices based on the received information. Each of the groups comprises only lighting devices with similar power on/off-related behavior.

A step 105 comprises controlling a lighting device of the plurality of lighting devices in response to a user command. A step 107 comprises determining that a problem has occurred when controlling the lighting device. A step 109 comprises identifying one group of the groups. This one group comprises the lighting device. A step 111 comprises determining a power on/off state of at least one other lighting device, e.g. all lighting devices, in the identified group. In the embodiment of FIG. 2, step 111 further comprises determining a further power on/off state of one or more further lighting devices of the plurality of lighting devices, e.g. at least one lighting device from each group.

A step 113 comprises determining diagnostic information based on the one or more power on/off states and the one or more further power on/off states. The diagnostic information indicates a likely cause for the problem. A step 115 comprises providing the diagnostic information to the user.

Figure 3:
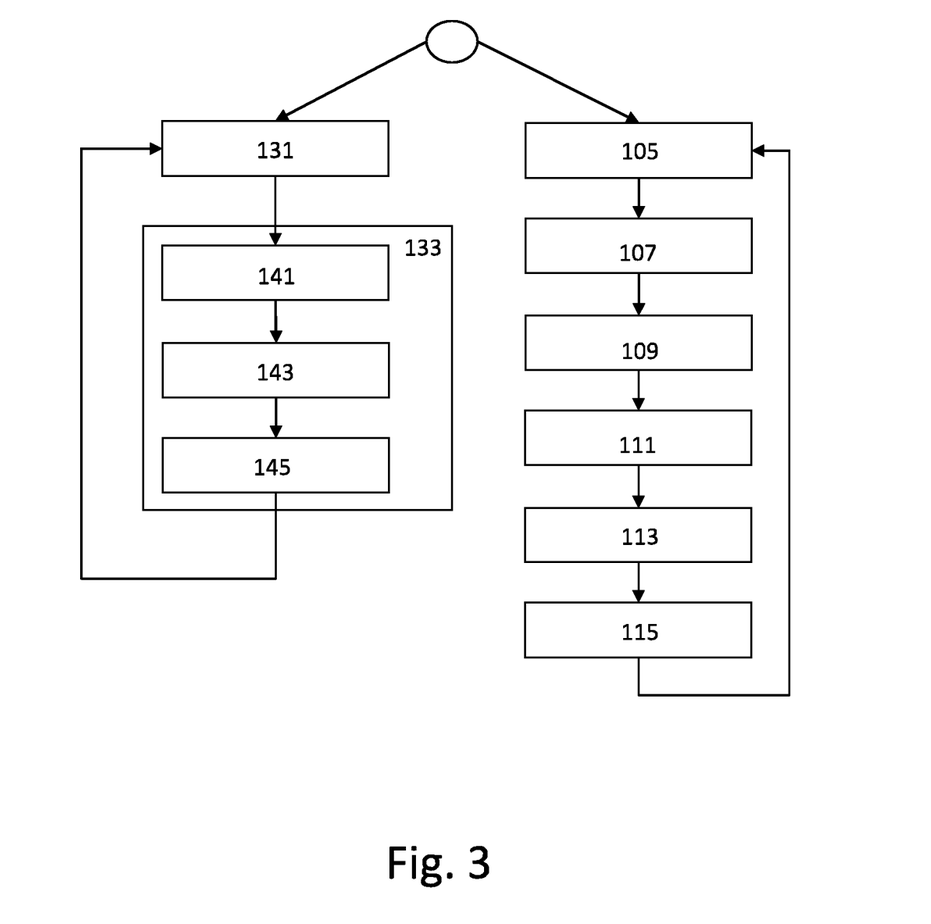
FIG. 3 is a flow diagram of a second embodiment of the method.

A second embodiment of the method of controlling a plurality of lighting devices and partitioning the plurality of lighting devices into groups is shown in FIG. 3. In the embodiment of FIG. 3, two processes run in parallel. In the first process, a step 131 is performed first. Step 131 comprises receiving information identifying power on/off-related behavior from each of the plurality of lighting devices. In the embodiment of FIG. 3, the lighting devices report they are turning off via Zigbee. The lighting devices monitor their voltage and in the presence of a voltage drop use the last available moments to send a Zigbee message stating they are "Shutting Down". These Zigbee messages are received in step 131. The information identifying the power on/off-related behavior received from the lighting devices comprises a time stamp indicating when the lighting device last turned off.

A step 133 comprises partitioning the plurality of lighting devices in groups of lighting devices based on the received information. Each of the groups comprises only lighting devices with similar power on/off-related behavior. In the embodiment of FIG. 3, step 133 comprises three sub steps 141-145.

Step 141 comprises determining a potential new group for lighting devices showing similar power on/off-related behavior. Step 143 comprises increasing a counter associated with the new group each time the lighting devices show similar power on/off-related behavior. Step 145 comprises assigning the lighting devices to the new group when the counter reaches a minimum value. In the time before any lighting device is assigned to a new group, all lighting devices are part of a default group. Step 131 is repeated after step 133 to receive the next Zigbee message(s). In the second process, steps 105-115 of FIG. 2 are performed.

Figure 4:
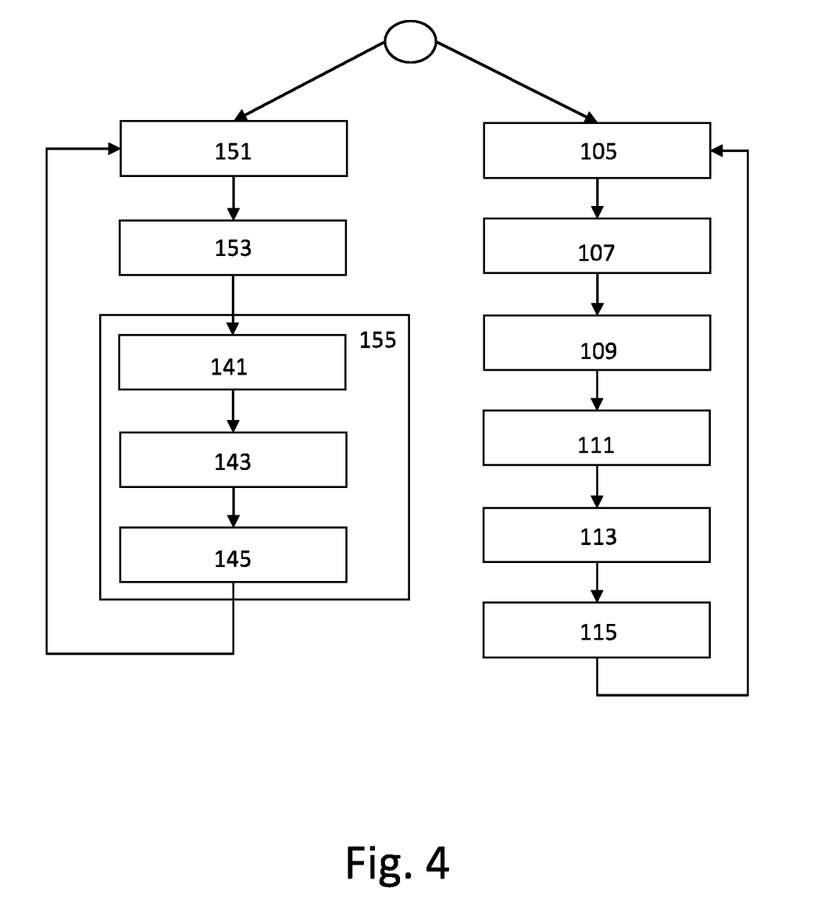
FIG. 4 is a flow diagram of a third embodiment of the method.

A third embodiment of the method of controlling a plurality of lighting devices and partitioning the plurality of lighting devices into groups is shown in FIG. 4. In the embodiment of FIG. 4, the lighting devices do one or more of the following:

Store a real time clock time stamp on the moment they turned off. If lighting devices do not have enough energy to send a Zigbee message during the last moments before a shutdown, they can store the moment they turned off by saving in Non-Volatile Memory (NVM) the value of their Real Time Clock (RTC). An attribute called SHUTDOWN-MOMENT may be used for this purpose. Thus, the information identifying the power on/off-related behavior received from the lighting devices comprises a time stamp indicating when the lighting device last turned off. The RTCs of the different lighting devices may be synchronized with each other or with a radio signal or Internet clock.

Store a (time) counter representing for how long they have been on. If lighting devices do not have enough energy to store a time stamp in NVM, they can track how long they have been on. An attribute called ONTIME may be used for this purpose. Thus, the information identifying the power on/off-related behavior received from the lighting devices comprises a duration indicating how long the lighting device has been turned on.

In the embodiment of FIG. 4, again, two processes run in parallel. In the first process, a step 151 is performed first. Step 151 comprises transmitting one or more requests for at least part of the information identifying the power on/off-related behavior to one or more of the lighting devices, e.g. at regular intervals and upon startup of the control system performing the method. Step 153 comprises receiving information identifying power on/off-related behavior from the one or more lighting devices.

Step 155 comprises partitioning the plurality of lighting devices in groups of lighting devices based on the received information. Each of the groups comprises only lighting devices with similar power on/off-related behavior. In the embodiment of FIG. 4, step 155 comprises the same three sub steps 141-145 as step 133 of FIG. 3. Step 151 is repeated after step 155 at a later time, e.g. after a polling timer has reached zero. In the second process, steps 105-115 of FIG. 2 are performed.

Figure 5:
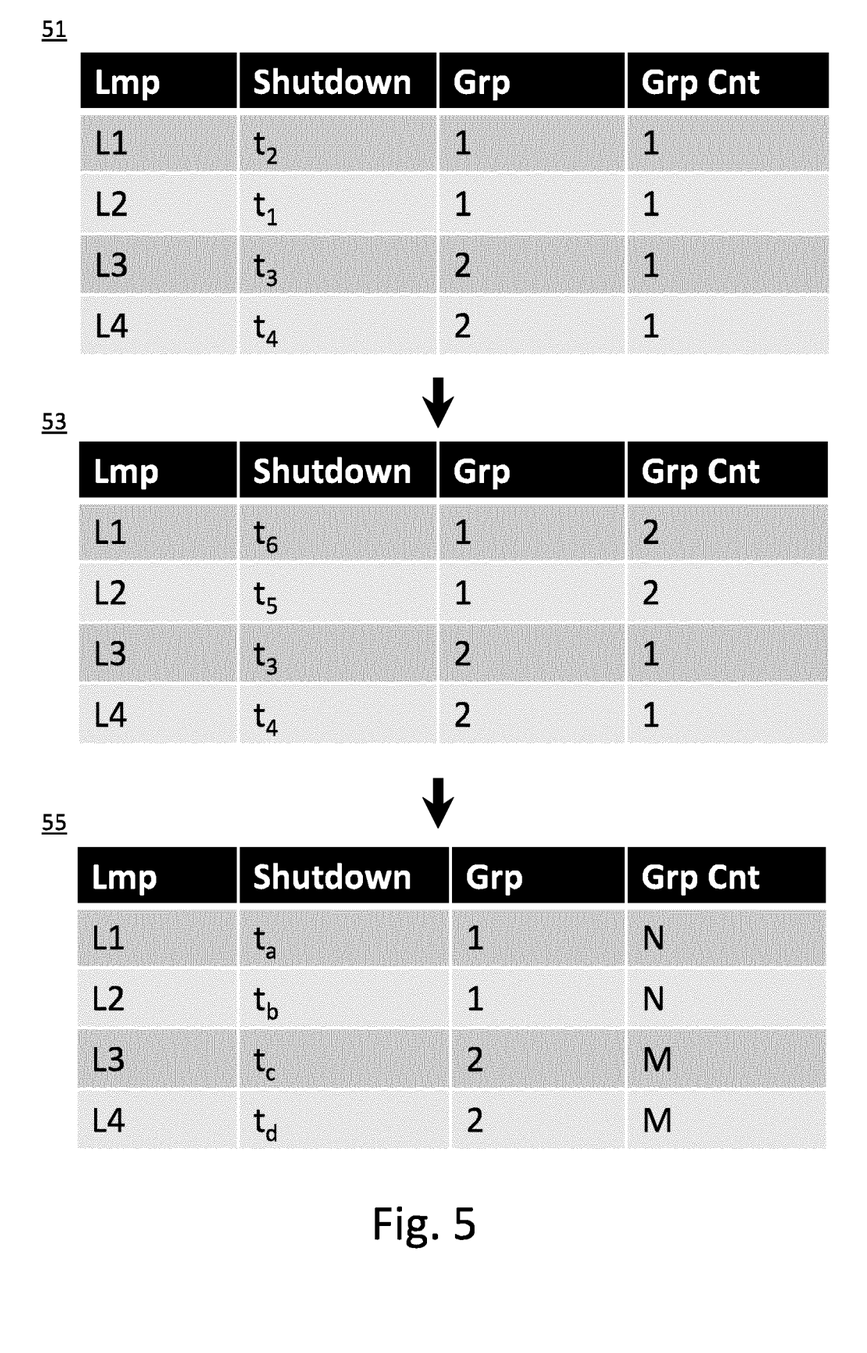
FIG. 5 shows examples of grouping information.

FIG. 5 shows examples of grouping information. The lighting devices 13-16, i.e. lamps L1-L4, operate behind a wall switch or power strip and are partitioned into groups by using the above-mentioned SHUTDOWNMOMENT or ONTIME attribute. This grouping is used to determine diagnostic information. Furthermore, if the bridge observes lighting devices of multiple or all groups shutting down, it can declare an outage based on this instead of having to observe all lighting devices shutting down. More than one group must be identified in order to distinguish between a wall switch or power strip being switched off and a power outage.

At moment 51, L1 has last shut down at moment $t_2$, L2 has last shut down at moment $t_1$, L3 has last shut down at moment $t_3$, and L4 has last shut down at moment $t_4$. $t_1$ is within 200 ms of $t_2$ and L1 and L2 are therefore potentially in the same group, new candidate group 1, with a counter of 1. $t_3$ is within 200 ms of $t_4$ and L3 and L4 are therefore potentially in the same group, new candidate group 2, with a counter of 1.

At moment 53, L1 has last shut down at moment $t_6$, L2 has last shut down at moment t5, L3 has last shut down at moment $t_3$, and L4 has last shut down at moment $t_4$. $t_5$ is within 200 ms of $t_6$ and the group counters for L1 and L2 are therefore increased to 2.

This continues several times until moment 55. At moment 55, L1 has last shut down at moment $t_a$, L2 has last shut down at moment $t_b$, L3 has last shut down at moment $t_c$ and L4 has last shut down at moment $t_d$. The group counters for L1 and L2 are now N and the group counters for L3 and L4 are now M. Since N and M exceed the minimum value required to form a definitive group, groups 1 and 2 are considered definitive groups, i.e. lamps L1 and L2 are assigned to group 1 and lamps L3 and L4 are assigned to group 2.

Now, when the lamps L1 and L3 are powered off at the same time, this is assumed to be caused by a power outage. When the lamps L1 and L2 are powered off at the same time, but neither L3 nor L4 is determined to be powered on and at least one of L3 and L4 is determined to be powered off, then this is assumed to be caused by the wall switch or power strip to which L1 and L2 are connected being switched off.

When the lamps L3 and L4 are powered off at the same time, but neither L1 nor L2 is determined to be powered on and at least one of L1 and L2 is determined to be powered off, then this is assumed to be caused by the wall switch or power strip to which L3 and L4 are connected being switched off. When at least one lamp from each group is determined to be powered on at a certain time, then a problem controlling a lamp is assumed to have a different cause than a wall switch or power strip being switched off or a power outage.

A problem is diagnosed when the control system encounters a problem controlling one of the lamps and the diagnosis information is provided to the user at this time, e.g. via a speaker in the control system, via another device in the same spatial area or via an Internet server. The control system may also report a power outage as soon as it detects it, e.g. by transmitting an event to the cloud. This can be used to determine Quality of Service statistics.

If a lamp is moved from one wall switch or power strip to another wall switch or power strip, it will be detected that they do not shutdown within 200 ms of each other and their group counters are then reset to zero. If one of these lamps shuts down within 200 ms of another lamp and this other lamp is not yet in a group, a new candidate group is created. If one of these lamps shuts down within 200 ms of another lamp and this other lamp is already in a group, the group counter of this lamp is increased to one and the group of this other lamp is associated with this lamp. However, this lamp is only considered to be part of the group of this other lamp when the counter reaches the minimum value.

Figure 6:
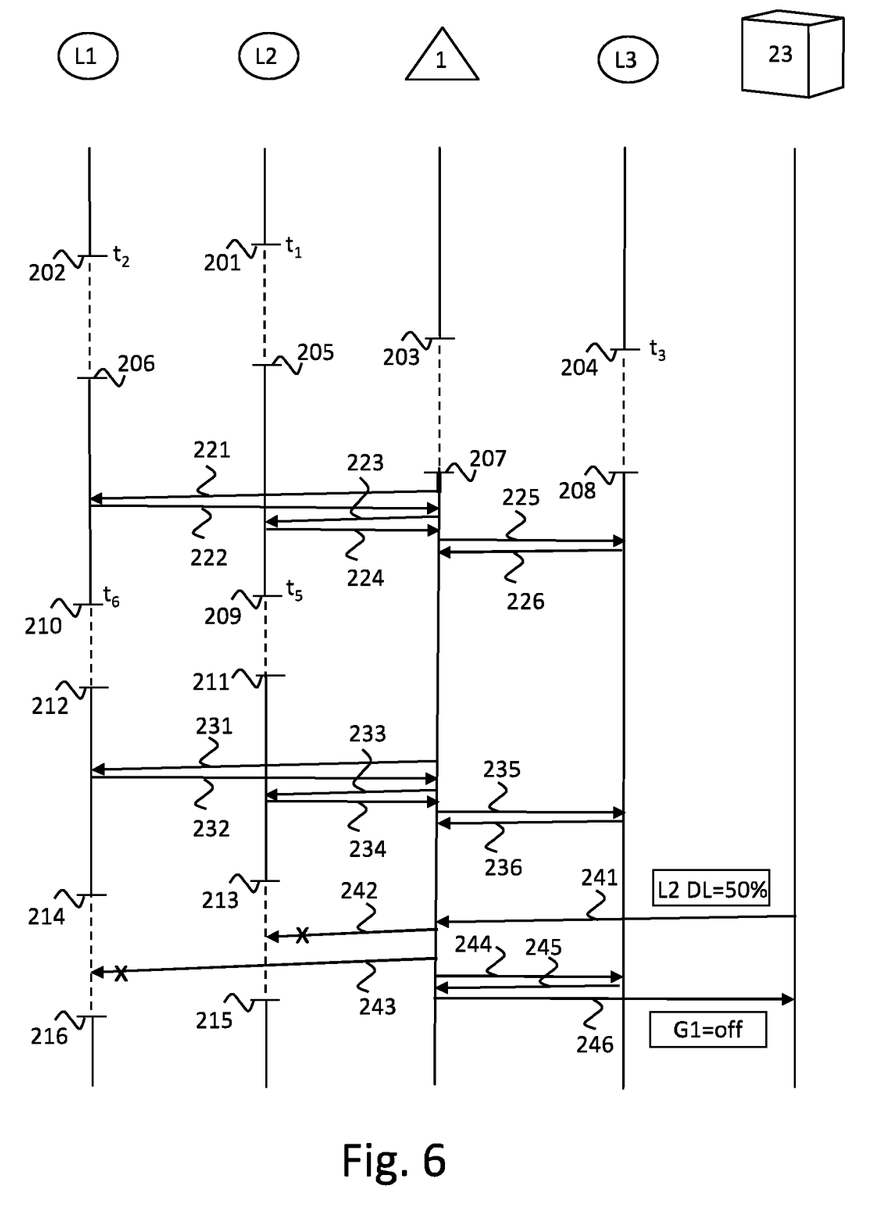
FIG. 6 depicts an example of the performance of the third embodiment of the method.

FIG. 6 depicts an example of the performance of the third embodiment of FIG. 4. The lamp L1 shuts down at moment 202 ($t_2$) and restarts at moment 206. The lamp L2 shuts down at moment 201 and restarts at moment 205. The lamp L3 shuts down at moment 204 ($t_3$) and restarts at moment 208. The bridge 1 shuts down at moment 203 and restarts at moment 207. Upon restarting, the bridge 1 polls the lamps L1-L3 to obtain the values of their SHUTDOWNMOMENT and/or ONTIME attributes.

The bridge 1 transmits a request 221 to lamp L1 and receives a response 222 with a SHUTDOWNMOMENT and/or ONTIME value in return. The bridge 1 then transmits a request 223 to lamp L2 and receives a response 224 with a SHUTDOWNMOMENT and/or ONTIME value in return. The bridge 1 further transmits a request 225 to lamp L3 and receives a response 226 with a SHUTDOWNMOMENT and/or ONTIME value in return.

Since moments 201 ($t_1$) and 202 ($t_2$) and moments 205 and 206 are close to each other, lamps L1 and L2 are suspected to be connected to the same wall switch or power strip and a counter is increased for these two lamps. As the moments 201 and 202 are close to each other, SHUTDOWNMOMENT values obtained from L1 and L2 will be close to each other. As the moments 205 and 206 are close to each other, ONTIME values obtained from L1 and L2 will be close to each other.

Later, the lamp L1 shuts down again at moment 210 ($t_6$) and restarts at moment 212. The lamp L2 shuts down again at moment 209 ($t_5$) and restarts at moment 211.

After a polling timer has reached zero, the bridge 1 polls the lamps L1-L3 to obtain the values of their SHUTDOWNMOMENT and/or ONTIME attributes again. The bridge 1 transmits a request 231 to lamp L1 and receives a response 232 with a SHUTDOWNMOMENT and/or ONTIME value in return. The bridge 1 then transmits a request 233 to lamp L2 and receives a response 234 with a SHUTDOWNMOMENT and/or ONTIME value in return. The bridge 1 further transmits a request 235 to lamp L3 and receives a response 236 with a SHUTDOWNMOMENT and/or ONTIME value in return.

If a SHUTDOWNMOMENT value is obtained from L3, this value has not changed after the bridge 1 restarted, so no counter is increased for L3 based on this information. If a ONTIME value is obtained from L3, this value has changed after the bridge 1 restarted, but as the value has increased rather than decreased, no power on/off behavior can be determined from this value, and no counter is increased for L3 based on this value.

Since moments 209 ($t_5$) and 210 ($t_6$) and moments 211 and 212 are close to each other, lamps L1 and L2 are again suspected to be connected to the same wall switch or power strip and a counter is increased for these two lamps. In this example, after the bridge 1 has received the last response, the bridge 1 determines that the counters for L1 and L2 have reached the minimum value and assigns L1 and L2 to the same group: group 1.

At a later time, the lamp L1 shuts down again at moment 214 and restarts at moment 216. The lamp L2 shuts down at moment 213 and restarts at moment 215. While the lamps L1 and L2 are powered off, the Internet server 23 transmits a high-level command message 241 to the bridge 1, e.g. commanding the lamp L2 to change its dim level to 50%. The Internet server 23 may be, for example, a Hue server that receives commands from smart speakers, e.g. Google Home and Amazon Echo devices.

The bridge 1 then tries to transmit a low-level command message 242 to lamp L2, but L2 does not receive this command message, as L2 is powered off. After the bridge 1 determines that it does not receive a response to the message 242, it determines that there seems to be a problem with lamp L2. The bridge 1 then tries transmits a request 243 (for SHUTDOWNMOMENT and/or ONTIME values) to lamp L1, but L1 does not receive this request, as L1 is powered off. The bridge 1 then knows that the problem is likely a wall switch or power strip being switched off or a power outage.

The bridge 1 then transmits a request 244 (for SHUTDOWNMOMENT and/or ONTIME values) to lamp L3. This time, the bridge 1 does receive a response. Since L1 and L2 have been assigned to the same group (group 1), the bridge 1 then determines that the problem is likely that a wall switch or power strip is switched off and communicates this as diagnostic information to the Internet server 23. The Internet server 23 may output this information to the user, e.g. using speech output on a smart speaker. Alternatively, the bridge 1 may output this information to the user itself, e.g. using a speaker incorporated into the bridge 1. If lamp L3 is part of the same group as a further lamp, e.g. lamp L4, then no request needs to be transmitted to this further lamp.

Figure 7:
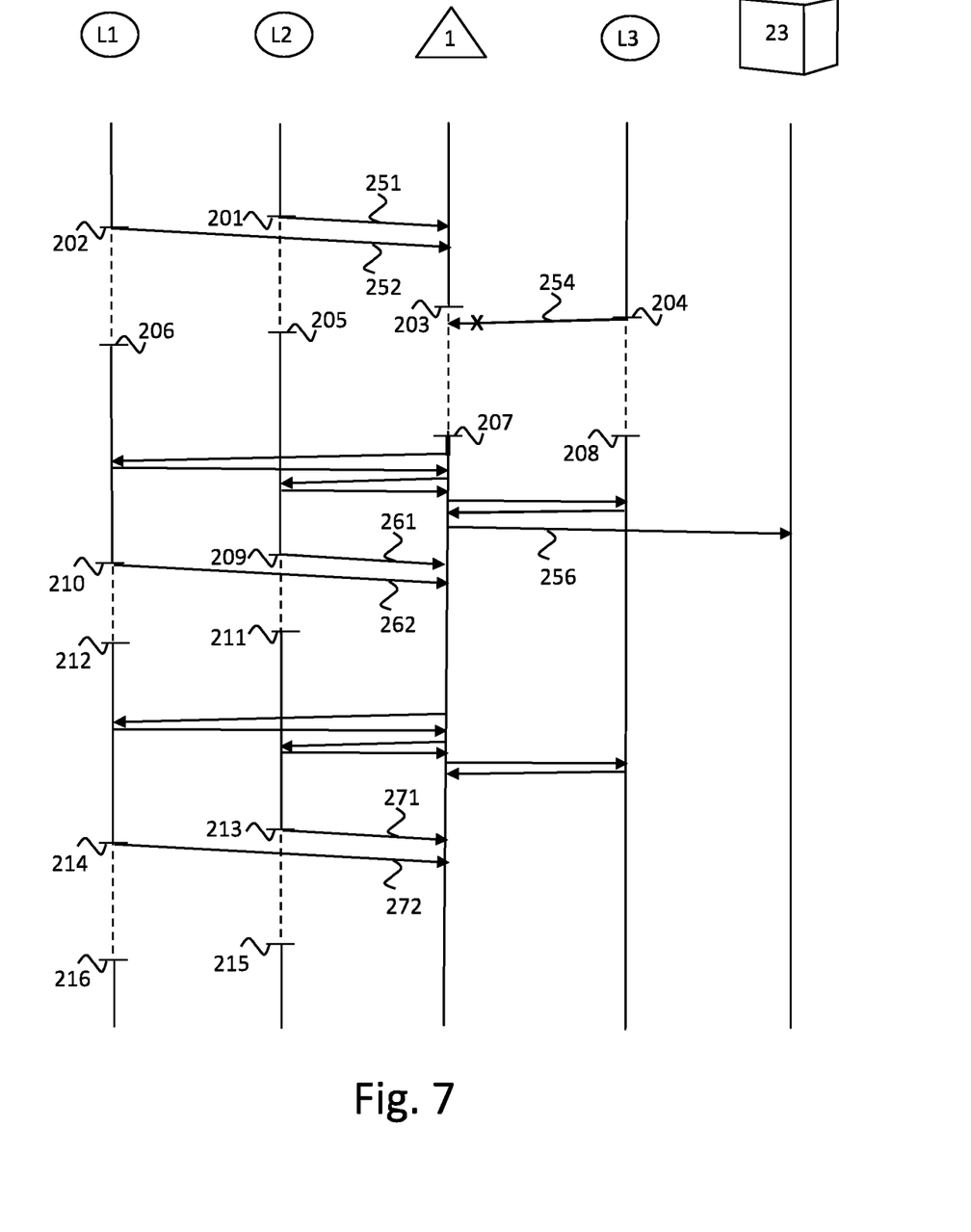
FIG. 7 depicts an example of the performance of a fourth embodiment of the method.

FIG. 7 depicts an example of the performance of a fourth embodiment of the method of controlling a plurality of lighting devices and partitioning the plurality of lighting devices into groups. This fourth embodiment is a variant on the third embodiment of which FIG. 6 depicts an example performance.

In the fourth embodiment, the lamps transmit a shutdown message when they are shutting down, i.e. a last-breath message. This shutdown message comprises a value of the SHUTDOWNMOMENT attribute. At moment 201, the lamp L2 transmits a shutdown message 251 to the bridge 1. At moment 202, the lamp L1 transmits a shutdown message 252 to the bridge 1. At moment 203, the lamp L3 tries to transmit a shutdown message 254 to the bridge 1, but since the bridge 1 is already powered off at that time, the bridge 1 does not receive this shutdown message.

At moment 209, the lamp L2 transmits a shutdown message 261 to the bridge 1. At moment 210, the lamp L1 transmits a shutdown message 262 to the bridge 1. At moment 213, the lamp L2 transmits a shutdown message 271 to the bridge 1. At moment 214, the lamp L1 transmits a shutdown message 272 to the bridge 1.

In the fourth embodiment of FIG. 7, the bridge 1 further transmits a message 256 to the Internet server 23 after it has booted and received all responses from the lamps. The message 256 identifies at least the shutdown moments 201, 202 and 204 of the lamps. If the bridge 1 receives values of the ONTIME attributes from the lamps, the message 256 may further identify the restart moments 205, 206 and 208 of the lamps or the durations of the shutdown. A duration of a shutdown may be calculated by determining the difference between the restart moment and the shutdown moment. The restart moment may be determined using the value of the ONTIME attribute and the time of transmission or receipt of the response of the lighting device. The Internet server 23 may use the received information to determine Quality of Service statistics.

In the embodiment of FIG. 7, the bridge 1 transmits the message 256 to the Internet server 23 if a wall switch or power strip has been switched off. In an alternative embodiment, the bridge 1 only transmits this type of message if a power outage is detected.

In the examples of FIGS. 6 and 7, two scenarios are depicted. In scenario 1, one or more of the lamps are powered off, but the bridge 1 stays powered on. This occurs when lamps L1 and L2 are powered off at moments 202 and 201, respectively. In the examples, this is due to the bridge 1 being connected to a different wall switch or power strip than L1 and L2. Alternatively, this could be due to the bridge 1 being behind a UPS or due to a power cut being so short that it did not affect the bridge 1.

In scenario 2, the bridge 1 is powered off at the same time as one or more of the lamps. This occurs when the bridge 1 and the lamp L3 shutdown at moments 203 and 204, respectively. When the bridge 1 is booting, it cannot be assumed that a restart (power on) message from the lamps can be received by the bridge 1, because it typically takes much longer for a bridge to boot than for lamps to boot. When the bridge 1 finished booting, it can poll the current values of SHUTDOWNMOMENT and/or ONTIME attributes. If the values of either of these attributes is within one second, the bridge 1 could declare a power outage.

In scenario 1, when the bridge 1 receives a user command to control one or more lighting devices, e.g. from the Internet server 23, and determines that a problem has occurred when controlling at least one of these lighting devices, it can determine the likely cause of the problem and output this cause as diagnostic information. In scenario 2, the bridge 1 is not able to receive the user command during the power outage and is only able to provide information on the power outage after it has rebooted, e.g. for determining Quality of Service statistics, and/or use the information received in relation to the power outage to partition the lighting devices into groups after it has rebooted. It is therefore beneficial to place the bridge 1 behind a UPS.

Figure 8:
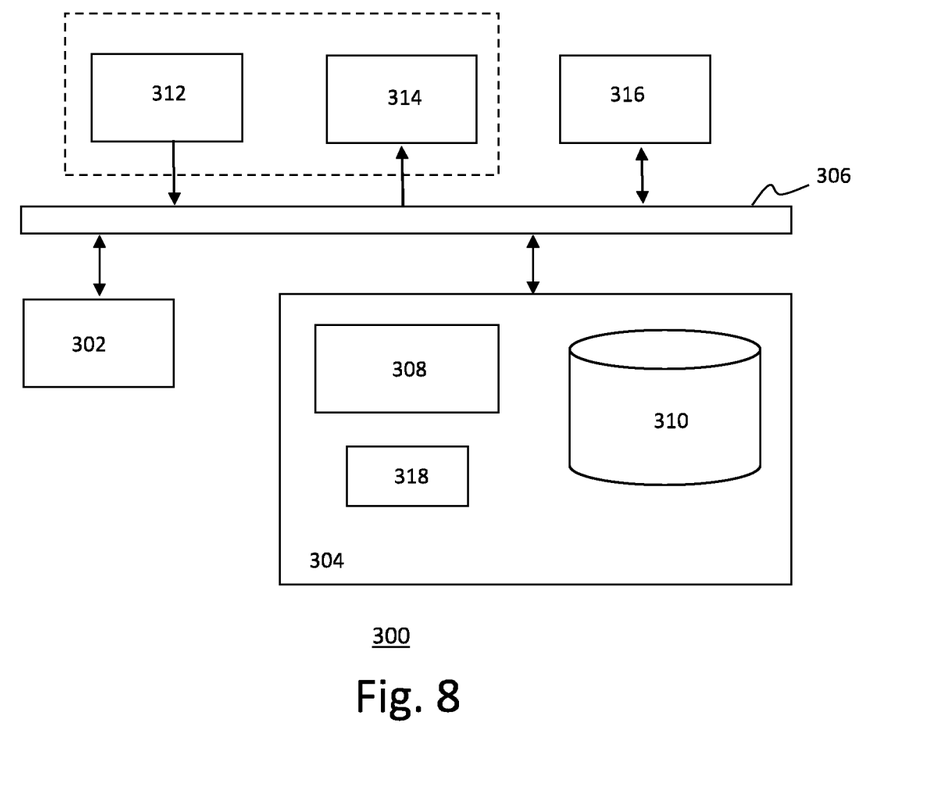
FIG. 8 is a block diagram of an exemplary data processing system for performing the method of the invention.

FIG. 8 depicts a block diagram illustrating an exemplary data processing system that may perform the method as described with reference to FIGS. 2-4.

As shown in FIG. 8, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 8 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 8, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 8) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A control system for controlling a plurality of lighting devices, comprising at least four lighting devices, and partitioning said plurality of lighting devices into groups, said control system comprising:
at least one input interface;
at least one output interface; and
at least one processor configured to:
use said at least one input interface to receive information identifying power on/off-related behavior from each of said plurality of lighting devices,
partition said plurality of lighting devices in groups of at least two lighting devices based on said received information, each of said groups comprising only lighting devices with similar power on/off-related behavior,
use said at least one output interface to control a lighting device of said plurality of lighting devices in response to a user command,
determine whether a problem has occurred when controlling said lighting device,
identify one group of said groups, said one group comprising said lighting device,
determine a power on/off state of at least one other lighting device in said identified group,
determine diagnostic information based said determined power on/off states, said diagnostic information indicating a likely cause for said problem, and
use said at least one output interface to provide said diagnostic information to said user.

2. A control system as claimed in claim 1, wherein said at least one processor is configured to determine a further power on/off state of one or more further lighting devices of said plurality of lighting devices, said one of more further lighting devices being part of a further group of said groups, and determine said diagnostic information further based on said one or more further power on/off states.

3. A control system as claimed in claim 2, wherein said one or more further lighting devices of which said further power on/off state is determined comprise at least one lighting device from each of said groups.

4. A control system as claimed in claim 1, wherein said at least one processor is configured to provide said diagnostic information using speech output.

5. A control system as claimed in claim 1, wherein said at least one processor is configured to use said at least one output interface to transmit one or more requests for at least part of said information identifying said power on/off-related behavior to one or more of said plurality of lighting devices.

6. A control system as claimed in claim 5, wherein said at least one processor is configured to use said at least one output interface to transmit said one or more requests to said one or more of said plurality of lighting devices upon startup of said control system.

7. A control system as claimed in claim 1, wherein information identifying said power on/off-related behavior received from one of said plurality of lighting devices comprises a time stamp indicating when said lighting device last turned off.

8. A control system as claimed in claim 1, wherein information identifying said power on/off-related behavior received from one of said plurality of lighting devices comprises a duration indicating how long said lighting device has been turned on.

9. A control system as claimed in claim 1, wherein said at least one processor is configured to partition said plurality of lighting devices in said groups of lighting devices by:
determining a potential new group for lighting devices showing similar power on/off-related behavior,
increasing a counter associated with said new group each time said lighting devices show similar power on/off-related behavior, and
assigning said lighting devices to said new group when said counter reaches a minimum value.

10. A control system as claimed in claim 1, wherein said at least one processor is configured to determine a power on/off state of at least one other lighting device in said identified group by determining a power on/off state of all lighting devices in said identified group.

11. A method of controlling a plurality of lighting devices, comprising at least four lighting devices, and partitioning said plurality of lighting devices into groups, said method comprising:
receiving information identifying power on/off-related behavior from each of said plurality of lighting devices;
partitioning said plurality of lighting devices in groups of lighting devices of at least two lighting devices based on said received information, each of said groups comprising only lighting devices with similar power on/off-related behavior;
controlling a lighting device of said plurality of lighting devices in response to a user command;
determining whether a problem has occurred when controlling said lighting device;
identifying one group of said groups, said one group comprising said lighting device;
determining a power on/off state of at least one other lighting device in said identified group;
determining diagnostic information based said determined power on/off states, said diagnostic information indicating a likely cause for said problem; and
providing said diagnostic information to said user.

12. A method as claimed in claim 11, further comprising determining a further power on/off state of one or more further lighting devices of said plurality of lighting devices, wherein said diagnostic information is further determined based on said one or more further power on/off states.

13. A method as claimed in claim 12, wherein said further lighting devices of which said further power on/off state is determined comprise at least one lighting device from each of said groups.

14. A method as claimed in claim 11, wherein said diagnostic information is provided using speech output.

15. A computer program or suite of computer programs comprising at least one software code portion or a computer program product storing at least one software code portion, the software code portion, when run on a computer system, being configured for enabling the method of claim 11 to be performed.

* * * * *